United States Patent
Matveev et al.

(10) Patent No.: US 10,740,496 B2
(45) Date of Patent: Aug. 11, 2020

(54) METHOD AND APPARATUS FOR OPERATING MULTI-PROCESSOR SYSTEM IN ELECTRONIC DEVICE

(71) Applicant: Samsung Electronics Co., Ltd., Suwon-si, Gyeonggi-do (KR)

(72) Inventors: Alexander Nikolaevich Matveev, Moscow (RU); Vladimir Vasilievich Podieiapolskii, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 15/868,660

(22) Filed: Jan. 11, 2018

(65) Prior Publication Data
US 2018/0232540 A1    Aug. 16, 2018

(30) Foreign Application Priority Data

Feb. 13, 2017    (RU) .............................. 2017104527
Jul. 28, 2017    (KR) ........................ 10-2017-0096189

(51) Int. Cl.
*G06F 21/74*    (2013.01)
*G06F 9/50*    (2006.01)
*G06F 9/4401*    (2018.01)

(52) U.S. Cl.
CPC ............ *G06F 21/74* (2013.01); *G06F 9/4405* (2013.01); *G06F 9/5055* (2013.01); *G06F 2209/5018* (2013.01)

(58) Field of Classification Search
CPC ...... G06F 21/74; G06F 9/4405; G06F 9/5055; G06F 2209/5018
See application file for complete search history.

(56) References Cited

U.S. PATENT DOCUMENTS

| 7,849,310 | B2 | 12/2010 | Watt et al. |
| 8,375,221 | B1 | 2/2013 | Thom et al. |
| 2004/0153672 | A1* | 8/2004 | Watt ...................... G06F 9/3012 726/22 |

(Continued)

FOREIGN PATENT DOCUMENTS

| RU | 2005115083 A | 1/2006 |
| WO | 2016128443 A1 | 8/2016 |

OTHER PUBLICATIONS

Russian Federal Service for Intellectual Property, "Decision on Grant of a Patent for Invention," Russian Application No. RU 2017104527/08, Nov. 9, 2017, 29 pages.

(Continued)

*Primary Examiner* — Jacob D Dascomb

(57) ABSTRACT

A method and an apparatus for operating a multi-processor system of an electronic device. The electronic device includes a memory for storing commands for running a secure Operating System (OS) and a non-secure OS, and at least one processor including a plurality of processor cores. Upon generation of at least one secure OS thread in the secure OS installed on the electronic device, the at least one processor generates and sends information indicating a secure mode operation request by assigning at least one of the processors cores in the secure OS, and executes the secure OS thread on the at least one processor core assigned in a secure mode based on the information.

20 Claims, 5 Drawing Sheets

(56) References Cited

U.S. PATENT DOCUMENTS

| | | | |
|---|---|---|---|
| 2013/0014124 A1* | 1/2013 | Alexander | G06F 9/5066 |
| | | | 718/104 |
| 2013/0031374 A1 | 1/2013 | Thom et al. | |
| 2014/0122820 A1 | 5/2014 | Park et al. | |
| 2014/0237621 A1 | 8/2014 | Spitz et al. | |
| 2015/0059007 A1 | 2/2015 | Wilson et al. | |
| 2015/0302219 A1* | 10/2015 | Lahteenmaki | G06F 21/74 |
| | | | 726/29 |
| 2017/0286168 A1* | 10/2017 | Simpson | G06F 9/505 |

OTHER PUBLICATIONS

ARM Limited, "ARM Security Technology, Building a Secure System using TrustZone Technology," PRD29-Genc-009492C, 2009, published on Dec. 9, 2010, 108 pages.

* cited by examiner

METHOD AND APPARATUS FOR OPERATING MULTI-PROCESSOR SYSTEM IN ELECTRONIC DEVICE

CROSS-REFERENCE TO RELATED APPLICATIONS AND CLAIM OF PRIORITY

This application is related to and claims priority to Russian Patent Application No. 2017104527, filed on Feb. 13, 2017 and Korean Patent Application No. 10-2017-0096189, filed on Jul. 8, 2017, the contents of which are incorporated herein by reference.

TECHNICAL FIELD

The present disclosure relates generally to a multi-processor system of an electronic device. More particularly, the present disclosure relates to a method and an apparatus for operating the multi-processor system under a secure Operating System (OS) and a non-secure OS of the electronic device.

BACKGROUND

As usage of mobile electronic devices such as electronic devices considerably increased throughout the world during the last decades, the electronic device advanced from an ordinary mobile phone intended only for voice communications and Short Message Service (SMS) message exchange to a compact powerful computing device and thus provides basic communication capabilities and various extendable Internet-based functionalities. In particular, hardware of a current smartphone includes a powerful processor or central processing unit (CPU) including multiple processors or CPU cores, and a multi-level memory system including large storage capacity.

An operating system (OS) is installed on a recent electronic device, and most application programs, that is, applications or apps are installed through the Internet and run under the OS of the electronic device to provide various functions to a user. The mobile OSes most commonly used in the smartphone include android and iPhone OS (iOS), and mobile apps are generally developed in each version operable on each OS.

As the electronic device grows as a compact computing device, a multi-threading technology previously implemented in a computer is applied to the electronic device. The multi-threading technology is designed to improve performance by splitting execution of an application program into a plurality of execution threads and executing the threads of the application program in parallel on multiple CPUs or CPU cores. The multi-threading technology is especially advantageous for computationally intensive applications. To support the computationally intensive applications, the mobile OS of a recent electronic device is presently designed to support the multi-threading and thus supports smooth execution of the computationally intensive applications as various action games and multimedia apps.

Meanwhile, growth of computational power of the electronic device is subject to an efficient power management issue. A recent smartphone with a battery fully charged cannot last half a day, which causes inconvenience for the user. In this regard, the mobile OS of the recent electronic device disables the individual CPU cores in some cases to thus reduce power consumption and, if necessary, sequentially enables the individual CPU cores.

Another issue is security. The recent electronic device can update or extend applications and the mobile OS. Hence, when updating or extending the OS or the app over the Internet, malicious software such as malicious code, which can compromise the OS up to a kernel level, can be downloaded. As a result, data security is significantly undermined.

Trustzone technology which is well-known in a processor architecture design provides two independent environments of a secure environment ('secure world') and a non-secure environment ('non-secure world') which are isolated from each other in terms of resources and hardware of the electronic device. To implement the two independent environments, a secure OS operates in the secure environment and a rich OS operates in the non-secure environment. Each CPU or CPU core is configured to operate either in a secure mode or in a non-secure mode. When one CPU core switches to the secure mode, the secure OS acquires control at the corresponding CPU core and can use resources of the electronic device, which are intended to be available in the secure environment. When another CPU core is in the non-secure mode, the rich OS acquires control at the corresponding CPU core and can use resources which are intended to be available in the non-secure environment.

Typical examples of the rich OS include android and tizen. The rich OS is a full-functional OS which the user directly interacts with, regardless of general OS interfaces or utilities or regardless of application programs executed thereunder. General operational aspects of the rich OS are well known, and the rich OS implements most drivers including drivers which directly manipulate hardware means of the electronic device, and particularly enables or disables the CPU core.

Unlike the rich OS, the secure OS has a rather small and very limited functionality, is less error-prone as possible, is responsible for only executing tasks which are actually sensitive in view of security, and drives only application programs executed in the secure OS, for example, trusted application programs. Owing to the limited functionality of the secure OS, the secure OS cannot directly allocate computational resources for executing secure OS threads. The secure OS uses a resource allocated according to a communication process of the rich OS through the rich OS. Accordingly, the secure OS cannot obtain necessary CPU cores allocated to the secure OS threads. Moreover, the secure OS can neither enable an idle CPU core nor request the rich OS to enable the idle CPU core, in order to optimize the secure OS operation.

As a result, even when the secure OS carries out execution which is parallelized, single-core parallelization which processes in only one CPU core can occur. The execution performance under the secure OS was not of great concern in the art. However, as the computational intensive secure application programs increase, they raise the performance issue not only in the secure OS but also in the entire electronic device.

SUMMARY

To address the above-discussed deficiencies, it is a primary object to provide a method and an apparatus for operating a multi-processor system of an electronic device.

Another aspect of the present disclosure is to provide a method and an apparatus for operating a multi-processor system of an electronic device so as to address issues of the related art.

According to the present disclosure, a method for operating an electronic device is provided. The electronic device includes at least one processor including multiple central processing unit (CPU) cores. Each CPU core operates either in a secure mode or in a non-secure mode. The electronic device installs a non-secure Operating System (OS) and a secure OS, both supporting multi-threading. The Secure OS and the non-secure OS are isolated from each other up to a hardware level and can communicate with each other through at least one predefined interface. Upon invoking a thread in the secure OS, the secure OS assigns the thread to a CPU core and thus modifies a CPU mask. The CPU mask is a data structure maintained in the secure OS to inform the non-secure OS on current requirements of the secure OS in CPU cores. The CPU mask modified by the secure OS is sent to the non-secure OS. The non-secure OS provides control at the CPU core to the secure OS based on the CPU mask by enabling the CPU core when the CPU core is disabled and switching the CPU core to the secure mode.

In accordance with an embodiment of the present disclosure, the isolation is implemented, in the sense of resources of the electronic device, as a non-secure environment and a secure environment. Each of the non-secure environment and the secure environment is enabled on a per-CPU core basis. When a CPU core is in the secure mode, the secure OS acquires control at the CPU core and is able to operate resources of the electronic device which are intended to be available in the secure environment. When a CPU core is in the non-secure mode, the non-secure OS acquires control at the CPU core and is able to operate resources of the electronic device which are intended to be available in the non-secure environment. The electronic device includes hardware resources which, when operated in the secure environment, are made unavailable from the non-secure environment. The secure OS includes a secure OS scheduler configured to schedule execution of secure OS threads. The non-secure OS includes a non-secure OS scheduler configured to schedule execution of non-secure OS threads, and a non-secure OS driver configured to communicate with the secure OS scheduler. The non-secure OS driver can enable CPU cores. A communication process includes a set of communication threads, each communication thread is mapped to a different CPU core such that the communication thread, when executing on a corresponding CPU core, switches the corresponding CPU core to the secure mode. The mapping can be implemented by setting an affinity property of the communication thread. The electronic device has memory areas which are accessible only by the secure OS.

In accordance with an embodiment of the present disclosure, the thread is one of one or more secure OS threads generated by a trusted application executing in the secure environment. When a non-secure OS client provides a command to be processed by the trusted application, the communication process places the command into its queue and assigns a respective communication thread to the command. When the corresponding communication thread launches on a CPU core, the CPU core is switched to the secure mode and the secure OS scheduler executes on the corresponding CPU core and unblocks the thread.

In accordance with an embodiment of the present disclosure, the data structure maintained by the secure OS scheduler includes a bit field. The bit field is modified by the secure OS scheduler. When no secure OS threads of the trusted application are not previously assigned to the corresponding CPU core, modifying the bit field can include setting a bit entry corresponding to the CPU core. Thus, the corresponding thread is placed into a secure OS scheduler queue and a time quote for execution of the thread is allocated.

According to a communication process by the secure OS scheduler, completion or preemption of a secure OS thread during execution on a CPU core occurs. In the case of the completion of the secure OS thread, the secure OS thread blocked, when no other secure OS threads currently execute on the corresponding CPU core, a corresponding CPU mask is updated by discarding a bit entry corresponding to the CPU core, and the updated CPU mask is embedded into a result of the execution and delivered to the non-secure OS. In the case of the preemption, the CPU mask is embedded into a result indicative of incomplete execution and delivered to the non-secure OS, or stored in a shared memory. Hence, control at the corresponding CPU core is transitioned back to the non-secure environment.

According to a communication process of the present disclosure, the non-secure driver retrieves the CPU mask from the result or from the shared memory, and matches the CPU mask with currently enabled CPU cores. When a particular CPU core is currently disabled, the non-secure drive enables the corresponding CPU core. The non-secure driver stores the CPU mask so that it is available to the communication process.

According to a communication process of the present disclosure, the CPU mask is monitored, a communication thread which is mapped to the CPU core is unblocked, and the communication thread is placed into a non-secure scheduler queue by the non-secure OS scheduler. When launching execution of the communication thread from the non-secure scheduler queue on the corresponding CPU core, the communication thread switches the CPU core to the secure mode. Thus, control at the CPU core is transitioned to the secure environment. The secure OS scheduler starts operating on the corresponding CPU core, and executes the thread.

Upon completion of the execution of the thread on the CPU core, the secure OS scheduler blocks the thread, update and embeds the CPU mask into a result of the execution, provides the result to the non-secure OS driver, and transitions control at the CPU core back to the non-secure environment. When no other secure OS threads are currently assigned to the CPU core, the secure OS scheduler updates the CPU mask by discarding the bit entry. The communication process can forward the result received from the secure OS driver to the non-secure OS client for further processing.

In accordance with an embodiment of the present disclosure, when the thread is preempted from the CPU core at expiration of the time quote or by an interruption received from the non-secure OS, the secure OS scheduler can return the corresponding thread to the secure OS scheduler queue to complete the execution later.

In accordance with an embodiment of this disclosure, the non-secure OS is configured to sequentially enable presently disabled CPU cores, as computational load increases in the electronic device, in a preset order defined by CPU core numbers, and the secure OS scheduler is configured to allocate CPU cores to secure OS threads in accordance with the predefined order.

In accordance with an embodiment of the present disclosure, an electronic device is provided. The electronic device includes at least one processor or CPU including multiple CPU cores. Each CPU core operates either in a secure mode or in a non-secure mode. The electronic device installs a non-secure OS and a secure OS. The non-secure OS and the secure OS both support multi-threading. The secure OS assigns a CPU core to a thread therein, and allocation includes modifying a CPU mask. The CPU mask is a data structure maintained in the secure OS to inform current requirements of the secure OS in CPU cores. The CPU mask is sent to the non-secure OS in order to request the non-secure OS to provide control at the CPU core to the secure OS. Hence, the corresponding CPU core is switched to the secure mode, and the secure OS obtains control at the corresponding CPU core.

A method of operating an electronic device which includes at least one processor including a plurality of processor cores is provided. A secure OS installed on the electronic device generates at least one secure Operating System (OS) thread, generates information indicating a secure mode operation request by assigning at least one of the processors cores, sends the information, and executes the secure OS thread on the at least one processor core assigned in a secure mode based on the information. When generating a first secure OS thread and a second secure OS thread, the method generates the information indicating the secure mode operation request by assigning a first processor core for executing the first secure OS thread and a second processor core for executing the second secure OS thread. When the assigned processor core is disabled, the method generates the information includes a request to enable the assigned processor core. The method can determine the at least one processor core for executing the secure OS thread among the plurality of the processor cores based on use information of the processor cores. The method determines the at least one processor core for executing the secure OS thread among the plurality of the processor cores based on an affinity property of the secure OS thread. In this case, the at least one processor core can be determined to execute different secure OS threads on different processor cores. The at least one processor core can be determined to execute the secure OS thread on a processor core which executes the smallest number of secure OS threads among the processor cores.

According to the present disclosure, a memory for storing commands for running a secure OS and a non-secure OS, and at least one processor including a plurality of processor cores are provided. When at least one secure OS thread is generated in the secure OS installed on the electronic device, the at least one processor generates and sends information indicating a secure mode operation request by assigning at least one of the processors cores in the secure OS, and executes the secure OS thread on the at least one processor core assigned in a secure mode based on the information.

An apparatus and a method according to various embodiments of the present disclosure enable the secure OS to request usage of CPU cores and thus can optimize the number of available CPU cores according to a secure environment. Further, the performance of the secure OS is improved by speeding up secure OS operations and minimizing reply delay of the secure OS.

Other aspects, advantages, and salient features of this disclosure will become apparent to those skilled in the art from the following detailed description, which, taken in conjunction with the annexed drawings, discloses exemplary embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose; be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer eadable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure are used for only describing a specific embodiment and are not intended to limit the scope of other embodiments. A singular form can include a plurality of forms unless it is explicitly differently represented. All the terms used herein, including technical and scientific terms, can have the same meanings as terms that are generally understood by those skilled in the art. The terms defined in a general dictionary can be interpreted to have the same or similar meanings as in the context of the relevant art, and, unless explicitly defined herein, terms in this disclosure shall not be interpreted ideally or excessively as formal meanings. In some cases, even the terms defined in this disclosure cannot be interpreted to exclude the embodiments of the present disclosure.

Various embodiments of the present disclosure will describe a hardware approach be described as an example. However, since various embodiments of the present disclosure include a technology using both hardware and software, the present disclosure does not exclude a software-based approach.

The present disclosure relates to a method for operating a multi-processor system and an electronic device having improved secure Operating System (OS). Hereinafter, terms indicating device components and terms indicating use environments are explained for the sake of understanding. Accordingly, the present disclosure is not limited to those terms and can employ other terms having technically equivalent meanings.

The electronic device according to the present disclosure includes, besides other well-known hardware components, at least one Central Processing Unit (CPU) or processor including a plurality of CPU cores. In the electronic device of the present disclosure, the CPU core is described merely to ease the understanding and indicates a plurality of CPUs or processors or at least one CPU or processor including a plurality of CPU cores. That is, the CPU core is a processing unit for carrying out functions to be explained and can be applied to an electronic device which employs a plurality of such units.

Figure 1:
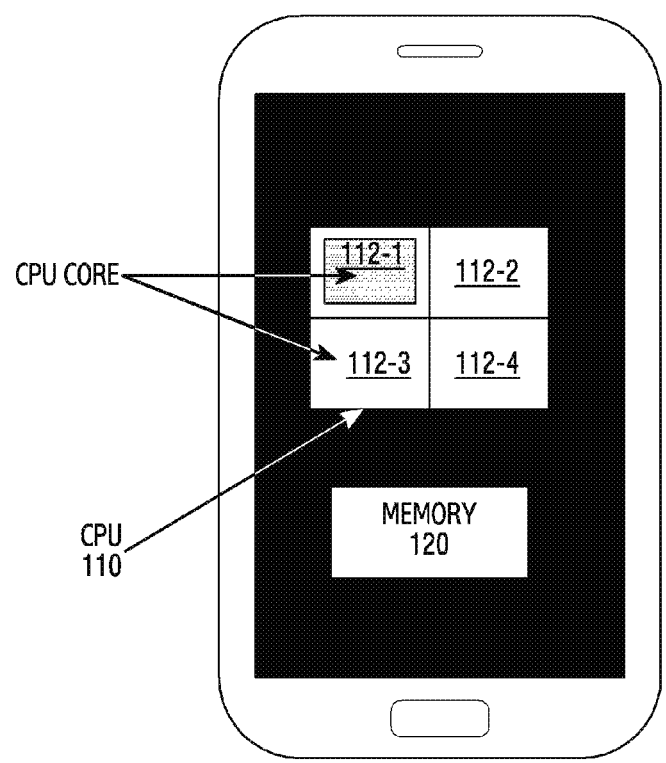
FIG. 1 illustrates a simplified diagram of an electronic device including a Central Processing Unit (CPU) including four CPU cores.

FIG. 1 illustrates a simplified diagram of a smartphone including a CPU having four CPU cores.

Referring to FIG. 1, the electronic device includes a CPU 110 and a memory 120. The CPU 110 includes a plurality of CPU cores 112-1 through 112-4. Each CPU core can be physically enabled/disabled, for example, switched on/off, and is adopted to operate either in a secure mode or in a non-secure mode. The electronic device has two OSes of a RichOS which is a non-secure OS and a SecureOS which is a secure OS, installed therein. That is, the memory 120 stores instructions for operating the secure OS and the non-secure OS. While the secure OS is, but not limited to, the SecureOS and the non-secure OS is, but not limited to, the RichOS to facilitate the understanding, the embodiments of the present disclosure can employ any electronic device which installs and runs two separate OSes of the secure OS and the non-secure OS.

When the electronic device employs multiple CPUs or processors, the electronic device can operate per CPU or per processor (or processor core). For the sake of the understanding, operations per CPU core or per processor core are explained. In each of the secure OS and the non-secure OS, each OS has its own system register. When one CPU core is switched to the secure mode, the secure OS can acquire control at the corresponding CPU core and use resources of the electronic device which are intended for a secure environment. At the same time, when another CPU core is in the non-secure mode, the non-secure OS can acquire control at the corresponding CPU core and use resources intended for a non-secure environment. That is, the non-secure environment and the secure environment are each enabled on a per-CPU basis. For example, while one CPU core operates in the secure mode and the secure OS controls a corresponding CPU core in the secure environment, another CPU core can operate in the non-secure mode under control of the non-secure OS of the non-secure environment.

The non-secure OS and the secure OS both support multi-threading and simultaneously operate in the electronic device. The secure OS and the non-secure OS are isolated from each other up to a hardware level. At least one predefined interface is provided for communications between the two OSes. The interface is defined, for example, in http://infocenter.arm.com/help/topic/com.arm.doc.prd29-genc-009492c/PRD29-GENC -009492C_trustzone_security_whitepaper.pdf.

Google trusty is an example of the known secure OS, and known mobile OSes such as android and tizen are examples of the non-secure OS.

The two isolated OSes are implemented as the non-secure environment ('non-secure world') and the secure environment ('secure world') in terms of the resources of the electronic device. As described above, each of the non-secure environment and the secure environment can be enabled on the per-CPU core basis. That is, when one CPU core is in the secure mode, the secure OS can acquire control at the corresponding CPU core and operate the resources of the electronic device which are intended to be available in the secure environment. When one CPU core is in the non-secure mode, the non-secure OS can acquire control at the corresponding CPU core and operate resources of the electronic device which are intended to be available in the non-secure environment. In this case, when certain hardware resources of the electronic device are used in the secure environment, the corresponding resources are absolutely unavailable from the non-secure environment. In particular, the electronic device has a memory (e.g., dynamic random access memory (DRAM)) region which is accessible only by the secure OS. The resources of the electronic device which are accessible only the in the secure OS are not physically accessible from the non-secure environment. Hence, it is possible to safely maintain critically sensitive information, for example, security keys or security codes. Even when the non-secure OS is remotely controlled up to its kernel level, it cannot access the resources accessible only by the secure OS.

When the electronic device is booted up and a boot sequence is completed, the secure OS can be initialized first and then the non-secure OS can be initialized. A non-secure OS driver is implemented as a specialized system component of the non-secure OS, and a secure OS scheduler is implemented as a specialized system component of the secure OS. The non-secure OS driver and the secure OS scheduler are configured to communicate with each other through the aforementioned interface. Besides providing communications with the secure OS, the non-secure OS driver enables and disables the CPU cores. The secure OS scheduler schedules execution of secure OS threads by maintaining an execution queue of the secure OS threads. In the non-secure mode, a non-secure OS scheduler is implemented to maintain an execution queue of non-secure OS threads and to schedule execution of the non-secure OS threads.

For example, when the electronic device is a smartphone and a user inputs a password on a locked touch screen of the stnartphone in order to unlock the touch screen, a non-secure OS client application program executes a command which is sent to a communication process. The communication process is a non-secure OS function including a set of communication threads as many as CPU cores of the smartphone. Each communication thread can be mapped to a particular CPU core so that the communication thread executes on the CPU core. Such mapping is introduced by symmetric multiprocessing. When a communication thread begins to execute on a CPU core, it switches the CPU core to the secure mode. Thus, upon receiving the command, the communication process unblocks one of communication threads to assign the command and the corresponding communication thread executes on some CPU cores and switches a corresponding CPU core into the secure mode. Hence, the secure OS acquires control at the CPU core, and the secure OS scheduler starts executing thereon and unblocks a thread of a trusted application responsible for secure processing touch screen input. The trusted application thread executes in the CPU core of the secure mode to process the command, and, during the execution, all touch screen controllers of the smartphone operate only in the secure environment. That is, neither the non-secure application executing on another CPU core nor the non-secure OS itself can physically access the touch screen controllers. This access denial is implemented on the level of busses which service corresponding controllers. Other hardware of the smartphone can be unavailable in the non-secure environment in other contexts. When the command processing is completed, the thread is blocked, the CPU core is switched back into the non-secure mode, and a processing result is delivered by the secure OS scheduler to the non-secure OS driver and forwarded by the communication process to the non-secure OS client application. Hence, a sensitive operation as password authentication can be performed in a way secure from tampering.

Figure 2:
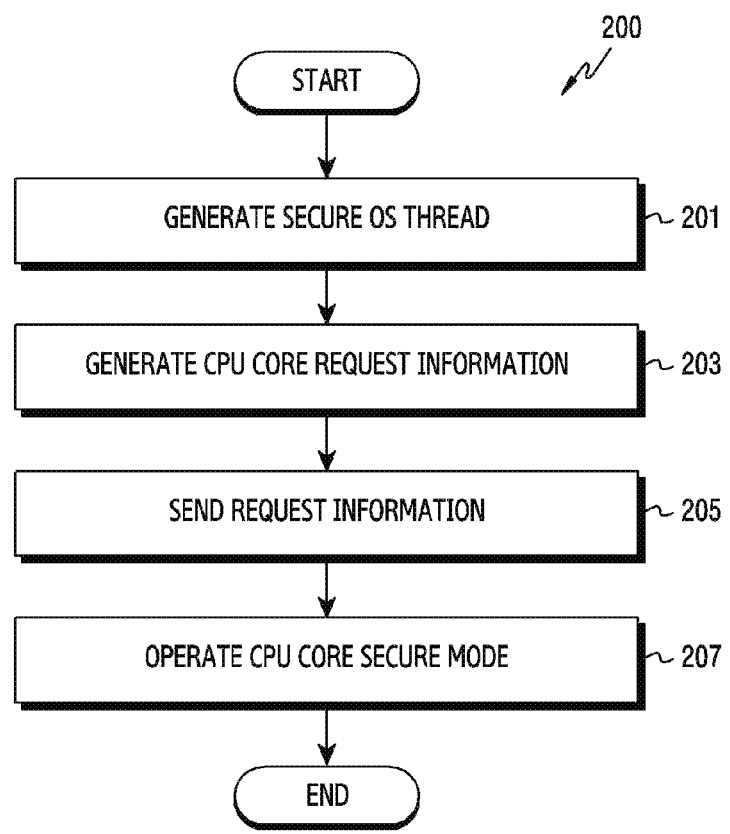
FIG. 2 illustrates a flowchart of a mechanism for operating a secure Operating System (OS) and a non-secure OS in an electronic device according to the present disclosure.

FIG. 2 illustrates a flowchart of a mechanism for operating a secure OS and a non-secure OS in an electronic device according to the present disclosure.

Now, referring to FIG. 2, a method 200 for operating the secure OS and the non-secure OS in an electronic device according to the present disclosure will be described.

In operation 201, the secure OS generates at least one secure OS execution thread denoted as a thread A for a command executed in the secure environment. Herein, while the thread A is explained by way of example, a plurality of threads, for example, the thread A and a thread B can be generated at the same time or in sequence. When the thread A and the thread B are generated at the same time or in sequence, subsequent operations to be explained can be carried out at the same time or in sequence.

As the secure OS generates the thread A, to assign a CPU core denoted as, for example, a CPU core A among CPU cores of the secure OS and to execute the thread A on the assigned CPU core A, the secure OS generates information requesting assignment to operate the CPU core A in the secure mode in operation 203. The information requesting the secure mode operation notifies the non-secure OS that the secure OS designates the CPU core A and requests to assign control of the designated CPU core A in the secure mode, and can indicate information about one or more CPU cores to be assigned, for example, identification information of the CPU cores, the number of the CPU cores, and current use information of the CPU cores.

According to an embodiment of the present disclosure, a special data structure indicating the request information in the secure OS is provided as an example of the secure mode operation request information. Hereafter, such a data structure is referred to as, for example, a CPU mask. The secure OS can use the CPU mask to inform the non-secure OS of current requirements of the secure OS on the CPU core. The CPU mask is the data structure designed to allocate an individual secure OS thread to a particular CPU core according to the present disclosure.

Figure 3:
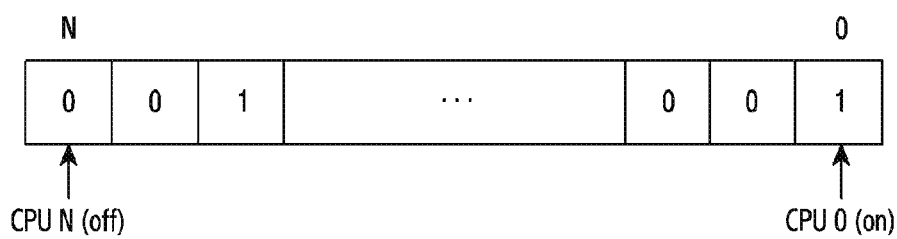
FIG. 3 illustrates a diagram of a CPU mask.

FIG. 3 illustrates a diagram of a CPU mask. In FIG. 3, the CPU mask is implemented as one bit field per CPU core. In this case, a communication process for a predefined bit field according to the implemented structure is negotiated between the secure OS and the non-secure OS in advance. Referring to FIG. 3, a data structure representing a thread, in particular, a secure OS thread can indicate information requesting to assign a corresponding secure OS thread to a particular CPU core using at least one bit field. For example, a CPU core indicated by each bit field is predefined and a bit field entry of the bit field can indicate allocation request of the particular CPU core indicated by the bit field, for example, the corresponding CPU core by a bit of the bit field. In another example, a predefined identification number corresponding to each CPU core may be input as the bit field entry to thus indicate a corresponding CPU core allocation request. FIG. 3 depicts an allocation request for a CPU 0 and a CPU N-2. When the thread is blocked and not allocated to any CPU core, a particular value, for example, 0 is contained as the bit field entry, for example, as the bit value.

A secure OS scheduler can implemented a reference counter array including a plurality of reference counters, for example, reference counters as many as the CPU cores, and can count how many threads are currently assigned to each CPU core using the reference counters. Hence, each reference counter can indicate use information of each CPU core. When a particular thread is assigned to a particular CPU core, a reference counter corresponding to the corresponding CPU core in the reference counter array increases by one. By contrast, when the thread is de-allocated from the corresponding CPU core, the corresponding counter decreases by one. According to an embodiment of the present disclosure, when the reference counter reaches zero, a bit entry corresponding to the CPU core can be discarded, for example, zeroed in the CPU mask. The CPU mask of FIG. 3 may be modified to indicate use information of each CPU core indicated by each reference counter, besides indicating the secure mode execution request for each CPU core.

When the secure OS requests the CPU core on the thread, a CPU core assigned the smallest number of threads can be allocated using, for example, current use information of the CPU cores. Also, to map a particular thread to a particular CPU core, an affinity property of a corresponding thread can be used. The affinity property can be set to, for example, map threads to different CPU cores. For example, 'weak affinity' can be set for a particular thread and indicate that the corresponding thread is allowed to execute on any CPU core unless the CPU core for executing the thread is separately assigned. Also, the thread can execute only on a CPU core assigned according to the set affinity property. For example, when the electronic device includes two or more CPU cores having different performances, thread affinity information can be set to assign any one of a high-performance CPU core and a low-performance CPU core. The secure OS obtains the use information including the thread affinity property setting and maps the CPU core to the corresponding thread. Hence, by use of the affinity property, the thread processing can be enhanced and simultaneously throughput can be improved and power consumption can be reduced by satisfying requirements of the high-performance thread and other threads. Notably, the affinity property of the thread can be ignored or modified by the secure OS scheduler.

In operation 203, the secure OS or the secure OS scheduler sets the bit entry of the bit field corresponding to the CPU core A and modifies the CPU mask to indicate that the secure OS uses the CPU core A to execute the thread A.

It is should be obvious to those skilled in the art that the CPU mask is not limited to the bit field and other implementations of the CPU mask data structure are possible.

In operation 205, the secure OS sends request information generated to request to assign control over the CPU core A to the secure OS, for example, the CPU mask to the non-secure OS. In so doing, the communication is conducted through the above-mentioned interface between the secure OS and the non-secure OS. The bit entry set in the CPU mask corresponding to the CPU core A prohibits the non-secure OS from disabling the corresponding CPU core A, unless the bit entry is discarded, for example, zeroed.

In operation 207, based on the CPU core allocation request information for the secure mode operation, for example, based on the CPU mask, the non-secure OS assigns the CPU core A in the secure mode. For doing so, the non-secure OS can switch the CPU code A into the secure mode. For example, the non-secure OS can block non-secure OS thread allocation for the CPU core A and switch the corresponding CPU core A into the secure mode. When the CPU-core A is currently disabled, the non-secure OS enables the CPU core A based on the received CPU mask. Thus, the control at the CPU core A is provided to the secure OS, and the secure OS operates the assigned CPU core A in the secure mode and executes the secure OS thread A.

The method 200 described above is not limited to the thread A and can be applied to any secure OS thread or to a plurality of secure OS threads.

Figure 4:
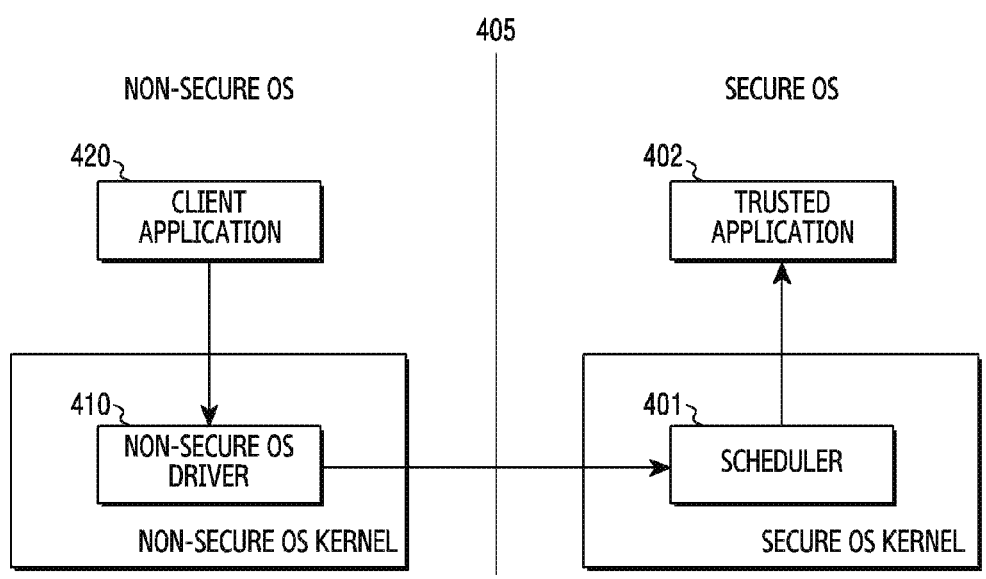
FIG. 4 illustrates a diagram of a configuration for operating a secure OS and a non-secure OS according to the present disclosure.

FIG. 4 depicts operations of a secure OS and a non-secure OS according to the present disclosure.

Now, configurations and operations of the secure OS and the non-secure OS involved in operations 201 through 207 are explained by referring to FIG. 4.

The secure OS includes a secure OS scheduler 401. A basic function of the secure OS scheduler 401 is to schedule execution of secure OS threads. According to an embodiment, the secure OS scheduler 401 is configured to maintain the CPU mask in the secure OS and to allocate secure OS threads to CPU cores as stated above. The CPU mask can be appropriately modified in the context of the allocation. That is, operation 203 can be conducted by the secure OS scheduler 401 according to an embodiment of the present disclosure.

As computational load increases in the electronic device, the non-secure OS sequentially enables currently disabled CPU cores in a preset order defined by CPU core numbers. According to an embodiment, the secure OS scheduler 401 allocates CPU cores to secure OS threads in the preset order. According to an embodiment, the secure OS scheduler 401 can allocate secure OS threads in ascending order of CPU core use, for example, allocate a secure OS thread first to a CPU core of a low reference counter based on the use information of the CPU cores.

The non-secure OS includes a non-secure OS scheduler (not shown). Similar to the secure OS scheduler, the non-secure OS scheduler is configured to schedule execution of non-secure OS threads.

The non-secure OS includes a non-secure OS driver 410. As aforementioned, the non-secure OS driver 410 physically enables or disables requested CPU cores by communicating with the secure OS scheduler 401. Also, the non-secure OS driver 410 switches the CPU core requested by the secure OS scheduler 401 into the secure mode and provides it to the secure OS. The communication between the secure OS and the non-secure OS is carried out between the secure OS scheduler 401 and the non-secure OS driver 410 through a predefined interface 405 as mentioned earlier.

The communication process according to an embodiment of the present disclosure is explained. The communication process is carried out by a non-secure OS system based on the communication between the secure OS and the non-secure OS. Accordingly, with respect to a communication thread corresponding to a communication with the secure environment to process a secure OS thread, the non-secure OS driver 410 can switch a corresponding CPU core into the secure mode so as to allow the corresponding secure OS thread to be processed on the CPU core during an assigned particular time slice.

The number of communication threads in one communication thread set is equal to the number of the CPU cores of the electronic device, and the communication threads are mapped to the CPU cores respectively so as to execute the corresponding communication thread on the mapped CPU core. When the communication thread for the communication between the secure OS and the non-secure OS for the execution of the non-secure OS thread starts to execute on the mapped CPU core, the corresponding CPU core mapped is switched into the secure mode.

The communication process executed by the non-secure OS system can include the communication thread for communicating with the secure environment and a thread for interoperating with a non-secure OS client.

Such mapping can be implemented by setting an affinity property of the communication thread. For example, 'weak affinity' can be set for a communication thread and indicate that the communication thread is allowed to execute on any CPU core unless the CPU core for executing the thread is separately assigned. For example, the electronic device includes two different CPU core clusters, a big cluster includes high-performance CPU cores, and a little cluster includes power-efficient low-performance CPU cores which are not highly productive. In this case, when the affinity property of the communication thread is set to assign the communication thread to the big-cluster CPU core, the corresponding communication thread executes on the high-performance CPU core. When a communication thread is assigned to the little-cluster CPU core, the corresponding communication thread executes on the low-performance CPU core. Thus, balance between the performance and the power consumption can be achieved using the affinity property.

According to an embodiment of the present disclosure, the affinity property of the communication thread can be set such that communication threads are mapped to different CPU cores respectively. That is, the affinity property of the communication thread can be set such that a one-to-one correspondence between the communication threads and the CPU cores is defined. In this case, a communication thread can execute only on a CPU core assigned by the set affinity property. The non-secure OS driver or the non-secure OS scheduler obtains the setting of the communication thread and maps the corresponding communication thread to the assigned CPU core.

The affinity property of the communication thread can be ignored or modified in the secure OS if necessary. When the non-secure OS driver 410 disables a particular CPU core, the non-secure OS scheduler can modify the affinity property of a corresponding communication thread and discard mapping of the communication thread corresponding to the CPU core of the non-secure OS. When CPU cores are unavailable, the non-secure OS scheduler can ignore the affinity property and execute corresponding threads on a currently available CPU core. On the contrary, when a previously disabled CPU core is re-enabled, the affinity property can be modified to restore mapping of a communication thread corresponding to the re-enabled CPU core.

Figure 5:
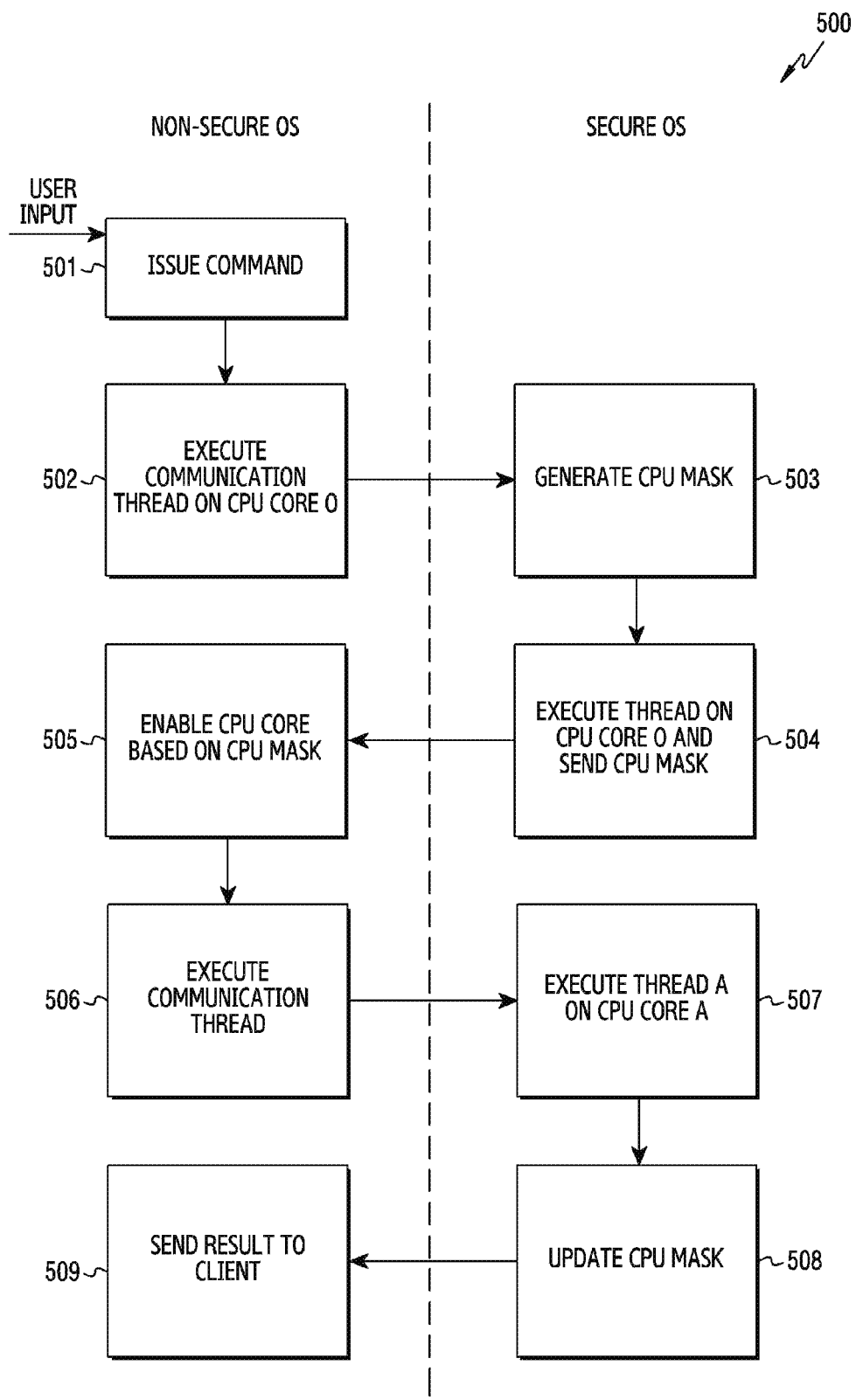
FIG. 5 illustrates a flowchart of a method for operating a secure OS and a non-secure OS in an electronic device according to an embodiment of the present disclosure.

Now, an embodiment of the present disclosure will be described with reference to FIGS. 2, 4, and 5. FIG. 5 illustrates a flowchart of a process 500 for operating an electronic device according to an embodiment of the present disclosure.

In operation 501, a non-secure OS client application program 420 running in the non-secure environment issues a command. The non-secure OS client application program 420 can be an application for providing the user with a Graphical User interface (GUI) for inputting a textual and/or graphical password or a GUI for scanning a user's iris in order to unlock a touch screen of a portable terminal, and for acquiring information which is input by the user. The command is issued by the non-secure OS client application program 420 in response to start of interaction of the user with the GUI in his/her attempt to unlock the touch screen. It is assumed that the command is processed by a secure OS trusted application 402 running in the secure environment which is responsible for user authorization. The trusted application 402 can be an application program which verifies user textual passwords, which demands resources at a modest level, or an application which verifies the user's iris, which demands considerable resources. That is, the command is substantilly intended to cause the trusted application 402 to process the input information accordingly and to return a processing result to the non-secure OS client application program 420.

The trusted application 402 is a multi-threaded application program. Hence, one or more secure OS threads are generated. At the absence of the abovementioned command. For example, when the electronic device is in a stanby mode and is not currently used by the user or when the user successfully unlocks the touch screen and operates the electronic device, threads of the trusted application are blocked.

After the non-secure OS client issues the command, the communication process receives the command, unblocks one of its communication threads to assign the received command, and thus places the communication thread into an execution queue of the non-secure OS scheduler in operation 502.

When the corresponding communication thread starts executing on a CPU core (hereinafter, referred to as a CPU core O) assigned by the non-secure OS scheduler in operation 502, the communication thread switches the CPU core O into the secure mode. Upon the switching, the secure OS scheduler 401 begins execution on the CPU core O and unblocks at least one execution thread of one or more secure OS threads of the trusted application 402 which is responsible for the command processing.

In the following, a plurality of threads of the trusted application 402 is unblocked and a thread A is one of those threads.

In operation 503, the secure OS scheduler 401 allocates the CPU core A to the unblocked thread A and updates a CPU mask when carrying out the allocation. As mentioned earlier, when a secure OS thread of the trusted application is not previously assigned to the CPU core A, the secure OS scheduler 401 sets a bit entry corresponding to the CPU core A in the CPU mask. In this case, the bit entry is modified, for example, from '0' to '1'. Other execution threads are processed in the same manner. That is, bit entries in the CPU mask are set in such a way to indicate current secure OS demands in the CPU cores. Next, the secure OS scheduler 401 places the unblocked threads into a secure OS scheduler queue and allocates a time quote for the thread execution.

As explained above, the secure OS scheduler 401 switches to execution of one (hereafter, referred to as a thread O) of the threads on the top of its corresponding queue on the CPU core O. In this case, the thread O executes on the CPU core O which is different from the CPU core currently assigned to the thread O in the CPU mask. The thread A is assumed to be presently in the secure OS scheduler queue. During the execution of the trusted application threads, certain hardware of the electronic device, for example, a touch screen controller, is operable in the secure environment only.

Operations 501, 502, and 503 of FIG. 5 can be substantially encompassed by operations 201 and 203 of FIG. 2.

Operation 504 relates to possible scenarios of the thread O execution. Preemption of the currently executing thread O from the CPU core O can occur. In this case, the thread O is returned to the secure OS scheduler queue so that the execution of the thread O is resumed thereafter. The thread O does not substantially differ from the thread A which is used for the sake of clarity only as an exemplary reference execution thread throughout the disclosure. Now, operations associated with the thread A will be explained.

The preemption can occur for the following reasons. First, the execution thread O can be preempted by the secure OS scheduler 401 upon expiration of the time quote allocated thereto. Second, the preemption can occur upon an interruption from the non-secure OS, and this mechanism is natively provided for in a secure OS/non-secure OS based wireless system. In the latter case, once the preemption takes place, the control at the CPU core can be transitioned to the non-secure environment, the interruption can be processed by the non-secure OS, and then the control is returned back to the secure environment.

According to the present disclosure, upon the preemption, the secure OS scheduler 401 returns a specific result indicative of the incomplete execution to the non-secure OS driver 410 through the interface 405. The current CPU mask can be attached to the corresponding specific result. In an alternative embodiment, the secure OS scheduler 401 can place the current CPU mask in a shared memory in response to the preemption and thus send to the non-secure OS driver 410.

The CPU core O can successfully complete the execution of the thread O upon the abovementioned initial execution of the thread O or upon a subsequent execution from the secure OS scheduler queue. In this case, the secure OS scheduler 401 blocks the thread O. When no other secure OS threads are currently assigned to the CPU core O, for example, when the reference counter associated with the CPU core O is zero, the secure OS scheduler 401 updates the CPU mask by zeroing the bit entry corresponding to the CPU core O and embeds the current CPU mask into the execution result.

Next, the successful execution result is sent by the secure OS scheduler 401 to the non-secure OS driver 410 through the interface 405, and the control at the CPU core O is transitioned back to the non-secure environment.

The reasons of the preemption as stated above are not the only possible ones, and there may be other reasons. In particualr, the following mechanism can be provided according to an embodiment of the present disclosure. When the CPU mask is modified in the secure OS and the modification is not associated with a secure OS thread currently executing on a CPU core, the currently executing secure OS thread is preempted from the corresponding CPU core and placed into the secure OS scheduler queue. This mechanism enables to convey the modified CPU mask, in any of the preemption-related ways discussed above, to the non-secure OS more operatively, so that the non-secure OS can timely obtain the most up-to-date version of the CPU mask.

Operation 504 of FIG. 5 corresponds to operation 203 of FIG. 2. In addition to operation 203 of FIG. 2, the non-secure OS driver is configured to prohibit disabling the CPU core while a respective bit is set in the CPU mask. This is implemented via a notification system in a non-secure OS kernel. When the non-secure OS kernel is about to disable the hardware CPU core, 'opinion' of all entities subscribed to notifications with respect to the corresponding event can be checked.

After operation 504, the process 500 transitions to the non-secure environment.

In operation 505, the non-secure OS driver 410 retrieves the CPU mask from the shared memory or from the result delivered by the secure OS scheduler 401. The non-secure OS driver 410 matches the CPU mask with currently enabled CPU cores, and enables the CPU core A when the CPU core A is currently disabled. Finally, the non-secure OS driver 410 stores the CPU mask in a storage location within the non-secure environment which is available to the communication process. The CPU core A is used throughout the specification merely as the reference CPU core for the sake of clarity, and any other CPU core can be enabled in the discussed manner.

The communication process obtains the CPU mask, and the non-secure OS scheduler unblocks a communication thread mapped to the CPU core A and then places the unblocked communication thread into a non-secure OS scheduler queue in operation 506. Upon launching execution of the communication thread from the non-secure OS scheduler queue on the CPU core A, the communication thread switches the CPU core A to the secure mode and thus transitions control at the CPU core A to the secure environment. In operation 506, the communication process forwards the result received from the non-secure OS driver 410 to the non-secure OS client application program 420 for further processing.

After operation 506, the process 500 returns to the secure environment.

In operation 507, the secure OS scheduler 401 starts executing on the CPU core A and executes a secure OS thread of the trusted application 420 which is currently on top of the secure OS scheduler queue. The executed thread can be, but not limited to, the thread A.

When the execution of the thread A on the CPU core A is successfully completed, the secure OS scheduler 401 blocks the thread A, updates and embeds the CPU mask into an execution result, and provides the result to the non-secure OS driver 410 in operation 508. In so doing, when the reference counter associated with the CPU core A is zero, the bit entry of the CPU core A is zeroed and discarded. Hence, the control at the CPU core A is transitioned back to the non-secure environment. Next, the result received from the non-secure OS driver 410 is forwarded by the communication process to the non-secure OS client application program 420 for further processing in operation 509.

According to the present disclosure, the secure OS can request the CPU core allocation for the secure OS thread. Hence, the secure OS can manage the CPU core allocation for the secure OS thread. In addition, the secure OS can control the number of available CPU cores. Thus, the secure OS can more efficiently use existing resources as needed. Further, the performance of the secure OS is improved to accelerate computationally intensive operations such as biometric recognition.

The methods according to embodiments described in the claims or the specification of the present disclosure can be implemented in hardware, software, or a combination of hardware and software.

As for the software, a computer-readable storage medium storing one or more programs (software modules) can be provided. One or more programs stored in the computer-readable storage medium can be configured for execution by one or more processors of the electronic device. One or more programs can include instructions for controlling the electronic device to execute the methods according to the exemplary embodiments of the present disclosure.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs can be stored to a memory combining part or all of those recording media. A plurality of memories may be equipped.

The programs can be stored in an attachable storage device accessible via a communication network such as Internet, Intranet, Local Area Network (LAN), Wide LAN (WLAN), or Storage Area Network (SAN), or a communication network by combining these networks. The storage device can access the electronic device through an external port. A separate storage device may access the electronic device over the communication network.

In the above-described various embodiments of the present disclosure, the elements included in the disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element, and the elements expressed in the singular form may be configured as a plurality of elements.

While this disclosure has been shown and described with reference to certain exemplary embodiments thereof, it will be understood by those skilled in the art that various changes in form and details may be made therein without departing from the spirit and scope of this disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating an electronic device which includes at least one processor including a plurality of processor cores, the method comprising:
generating at least one secure operating system (OS) thread in a secure OS installed on the electronic device;
generating information for requesting to operate in a secure mode by assigning at least one processor core for executing the at least one secure OS thread from the plurality of processor cores in the secure OS;
sending, by the secured OS the information to a non-secure OS through at least one predefined interface;
disabling, by the non-secure OS, at least one non-secure OS thread on the at least one processor core based on the information; and
executing the at least one secure OS thread on the at least one processor core based on the information.

2. The method of claim 1, wherein generating the information includes:
upon generating a first secure OS thread and a second secure OS thread, generating the information for requesting to operate in the secure mode by assigning a first processor core for executing the first secure OS thread and a second processor core for executing the second secure OS thread.

3. The method of claim 1, wherein generating the information includes:
upon detecting the at least one processor core is disabled, generating the information including a request to enable the at least one processor core.

4. The method of claim 1, wherein generating the information includes:
determining the at least one processor core for executing the at least one secure OS thread among the plurality of processor cores based on use information of the plurality of processor cores.

5. The method of claim 4, wherein determining the at least one processor core includes:
determining the at least one processor core to execute different secure OS threads on different processor cores.

6. The method of claim 4, wherein determining the at least one processor core includes:
determining the at least one processor core to execute the at least one secure OS thread on a processor core which executes the smallest number of secure OS threads among the plurality of processor cores.

7. The method of claim 4, wherein generating the information includes:
determining the at least one processor core for executing the at least one secure OS thread among the plurality of processor cores based on an affinity property of the at least one secure OS thread.

8. The method of claim 7, wherein determining the at least one processor core includes:
determining the at least one processor core to execute different secure OS threads on different processor cores.

9. The method of claim 7, wherein determining the at least one processor core includes:
determining the at least one processor core to execute the at least one secure OS thread on a processor core which executes the smallest number of secure OS threads among the plurality of processor cores.

10. The method of claim 1, wherein sending the information includes sending a CPU mask to a non-secure OS.

11. An electronic device comprising:
a memory for storing commands for running a secure operating system (OS) and a non-secure OS; and
at least one processor including a plurality of processor cores,
wherein the at least one processor is configured to:
generate at least one secure OS thread in the secure OS installed on the electronic device,
generate information for requesting to operate in a secure mode by assigning at least one processor core for executing the at least one secure OS thread from the plurality of processors cores in the secure OS,
send, by the secure OS, the information to a non-secure OS through at least one predefined interface,
disable, by the non-secure OS, at least one non-secure OS thread on the at least one processor core based on the information, and
execute the secure OS thread on the at least one processor core based on the information.

12. The electronic device of claim 11, wherein the at least one processor is further configured to, upon generation of a first secure OS thread and a second secure OS thread, generate the information for requesting to operate in the secure mode by assigning a first processor core for executing the first secure OS thread and a second processor core for executing the second secure OS thread.

13. The electronic device of claim 11, wherein the at least one processor is further configured to, upon detecting the at least one processor core is disabled, generate the information including a request to enable the at least one processor core.

14. The electronic device of claim 11, wherein the at least one processor is further configured to determine the at least one processor core for executing the secure OS thread among the plurality of the processor cores based on use information of the processor cores.

15. The electronic device of claim 14, wherein the at least one processor is further configured to determine the at least one processor core to execute different secure OS threads on different processor cores respectively.

16. The electronic device of claim 14, wherein the at least one processor is further configured to determine the at least one processor core to execute the secure OS thread on a processor core which executes the smallest number of secure OS threads among the plurality of processor cores.

17. The electronic device of claim 11, wherein the at least one processor is further configured to determine the at least one processor core for executing the secure OS thread among the plurality of processor cores based on an affinity property of the secure OS thread.

18. The electronic device of claim 17, wherein the at least one processor is further configured to determine the at least one processor core to execute different secure OS threads on different processor cores respectively.

19. The electronic device of claim 17, wherein the at least one processor is further configured to determine the at least one processor core to execute the secure OS thread on a processor core which executes the smallest number of secure OS threads among the plurality of processor cores.

20. The electronic device of claim 11, wherein sending the information indicating a secure mode operation request includes sending a CPU mask to a non-secure OS.

* * * * *